(12) United States Patent
Shaham et al.

(10) Patent No.: US 9,755,934 B1
(45) Date of Patent: Sep. 5, 2017

(54) SYSTEM, METHOD, AND COMPUTER PROGRAM FOR TESTING AT LEAST A PORTION OF A NETWORK FUNCTION VIRTUALIZATION BASED (NFV-BASED) COMMUNICATION NETWORK UTILIZING AT LEAST ONE VIRTUAL SERVICE TESTING ELEMENT

(71) Applicant: Amdocs Software Systems Limited, Dublin (IE)

(72) Inventors: Ido Shaham, Hod-HaSharon (IL); Michael Benattar, Lod (IL); Guy Levi, Raanana (IL); Ofer Hermoni, Yavne (IL)

(73) Assignees: Amdocs Software Systems Limited, Dublin (IE); Amdocs Develpment Limited, Limassol (CY)

( * ) Notice: Subject to any disclaimer, the term of this patent is extended or adjusted under 35 U.S.C. 154(b) by 138 days.

(21) Appl. No.: 14/606,991

(22) Filed: Jan. 27, 2015

(51) Int. Cl.
*H04L 12/26* (2006.01)
*H04W 24/00* (2009.01)
(Continued)

(52) U.S. Cl.
CPC .... *H04L 43/0876* (2013.01); *H04L 29/08846* (2013.01); *H04L 41/14* (2013.01);
(Continued)

(58) Field of Classification Search
CPC . H04L 43/00; H04L 43/0811; H04L 43/0835; H04L 43/0841; H04L 43/0876; H04L 43/10; H04L 43/50; H04L 2012/5625; H04L 1/00; H04L 41/26; H04L 45/26; H04L 41/5038; H04L 41/14;
(Continued)

(56) References Cited

U.S. PATENT DOCUMENTS 5,881,051 A * 3/1999 Arrowood ............... H04L 45/02
370/248
9,558,465 B1 * 1/2017 Arguelles ........... G06Q 10/0639
(Continued)

*Primary Examiner* — Edan Orgad
*Assistant Examiner* — Ivan O Latorre
(74) *Attorney, Agent, or Firm* — Zilka-Kotab, PC

(57) ABSTRACT

A system, method, and computer program product are provided for testing at least a portion of a Network Function Virtualization based (NFV-based) communication network utilizing at least one virtual service testing element. In use, at least one virtual service testing element is instantiated, the at least one virtual service testing element being operable for testing at least a portion of a NFV-based communication network including a plurality of virtual services. Further, at least one time to implement the at least one virtual service testing element is identified such that the at least one virtual service testing element tests the at least a portion of the NFV-based communication network by: sending a known test case communication from the at least one virtual service testing element as an input to an ingress point of the at least a portion of the NFV-based communication network; receiving a result of the input as an output at an egress point of the at least a portion of the NFV-based communication network; and analyzing the result to determine whether at least a portion of the NFV-based communication network is performing as expected.

17 Claims, 8 Drawing Sheets

(51) Int. Cl.
*H04L 29/08* (2006.01)
*H04L 12/24* (2006.01)
*G06F 9/455* (2006.01)

(52) U.S. Cl.
CPC .......... *H04L 41/5038* (2013.01); *H04L 43/00* (2013.01); *H04L 43/50* (2013.01); *H04W 24/00* (2013.01); *G06F 9/455* (2013.01); *H04L 41/26* (2013.01)

(58) Field of Classification Search
CPC ....... H04L 29/08837; H04L 29/08846; H04W 24/00; H04B 17/00; H04B 17/10; H04J 3/14; H04Q 11/045; G06F 2212/152; G06F 9/5077; G06F 9/455
USPC ..... 370/241, 241.1, 242, 245, 247, 251–253
See application file for complete search history.

(56) References Cited

U.S. PATENT DOCUMENTS

| | | | | |
|---|---|---|---|---|
| 2011/0188379 A1* | 8/2011 | Calippe | .................. | H04L 41/12 370/241.1 |
| 2012/0253728 A1* | 10/2012 | Chamas | .............. | G06F 11/2294 702/109 |
| 2013/0182714 A1* | 7/2013 | Vachharajani | .......... | H04L 45/44 370/400 |
| 2014/0201374 A1* | 7/2014 | Ashwood-Smith | ..... | H04L 49/70 709/226 |
| 2014/0223418 A1* | 8/2014 | Michelsen | .......... | G06F 11/3696 717/135 |
| 2014/0317293 A1* | 10/2014 | Shatzkamer | ............ | G06F 9/455 709/226 |
| 2015/0092564 A1* | 4/2015 | Aldrin | ................. | H04L 41/5038 370/241.1 |
| 2015/0113132 A1* | 4/2015 | Srinivas | .............. | H04L 41/0816 709/224 |
| 2015/0195724 A1* | 7/2015 | Leal | ...................... | G06F 19/3418 370/242 |
| 2015/0205712 A1* | 7/2015 | Michelsen | .......... | G06F 11/3688 717/124 |
| 2015/0212920 A1* | 7/2015 | Kraus | ................. | G06F 11/3466 717/127 |
| 2015/0234725 A1* | 8/2015 | Cillis | ..................... | H04L 43/50 714/33 |
| 2015/0333979 A1* | 11/2015 | Schwengler | ........ | H04L 41/5054 709/226 |
| 2016/0011897 A1* | 1/2016 | Raskar | ................ | G06F 9/45558 718/1 |
| 2016/0026558 A1* | 1/2016 | Krishnan | ............... | G06Q 10/00 717/124 |
| 2016/0028603 A1* | 1/2016 | Chakrabarti | ........ | H04L 43/0852 370/252 |
| 2016/0050131 A1* | 2/2016 | Zhang | ................. | H04L 43/0811 370/244 |
| 2016/0057208 A1* | 2/2016 | Parikh | ..................... | H04L 67/10 714/4.11 |
| 2016/0127169 A1* | 5/2016 | Rosa de Sousa Teixeira | ............ | H04L 41/5025 370/216 |
| 2016/0182340 A1* | 6/2016 | Robitaille | ............... | H04L 43/14 370/241.1 |
| 2016/0197803 A1* | 7/2016 | Talbot | ..................... | H04L 43/08 709/224 |
| 2016/0212012 A1* | 7/2016 | Young | ..................... | H04L 41/14 |
| 2016/0259627 A1* | 9/2016 | Michelsen | ................ | G06F 8/22 |
| 2016/0335111 A1* | 11/2016 | Bruun | ................. | G06F 9/45558 |

* cited by examiner

US 9,755,934 B1

SYSTEM, METHOD, AND COMPUTER PROGRAM FOR TESTING AT LEAST A PORTION OF A NETWORK FUNCTION VIRTUALIZATION BASED (NFV-BASED) COMMUNICATION NETWORK UTILIZING AT LEAST ONE VIRTUAL SERVICE TESTING ELEMENT

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and generic software deployable over any Virtualized environment (i.e. Virtual Machine). Thus, NFV enables creating a network much more flexible and dynamic than a legacy communication network where HW and SW where tightly coupled. In NFV-based networks, a Virtual Network Function (VNF) decouples the software implementation of the network function from the infrastructure resources it runs on. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for dynamically testing such networks and associated functionality are limited.

There is thus a need for addressing these and/or other issues associated with the prior art.

SUMMARY

A system, method, and computer program product are provided for testing at least a portion of a Network Function Virtualization based (NFV-based) communication network utilizing at least one virtual service testing element. In use, at least one virtual service testing element is instantiated, the at least one virtual service testing element being operable for testing at least a portion of a NFV-based communication network including a plurality of virtual services. Further, at least one time to implement the at least one virtual service testing element is identified such that the at least one virtual service testing element tests the at least a portion of the NFV-based communication network by: sending a known test case communication from the at least one virtual service testing element as an input to an ingress point of the at least a portion of the NFV-based communication network; receiving a result of the input as an output at an egress point of the at least a portion of the NFV-based communication network; and analyzing the result to determine whether at least a portion of the NFV-based communication network is performing as expected.

DETAILED DESCRIPTION

Figure 1:
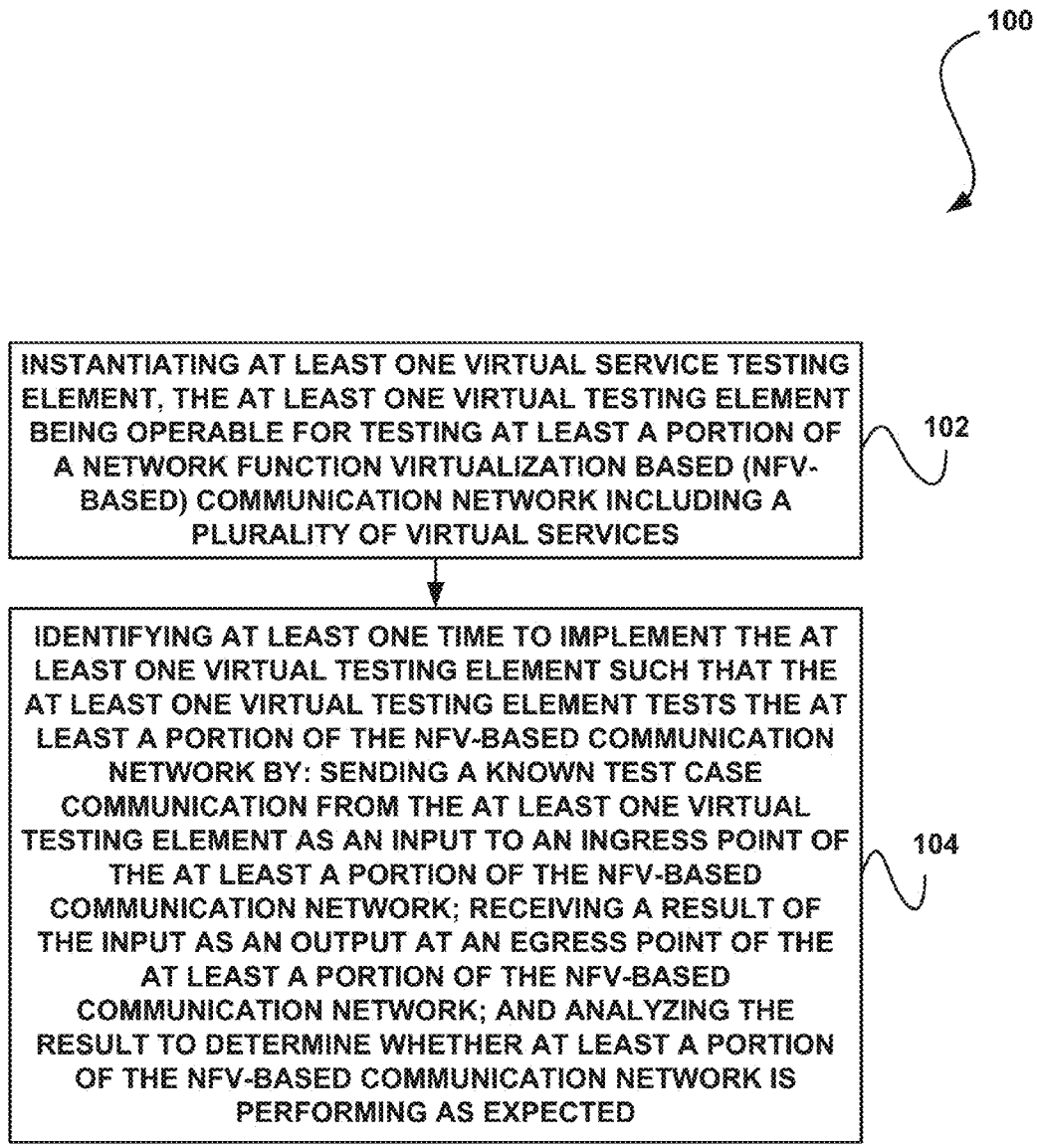
FIG. 1 illustrates a method for testing at least a portion of a Network Function Virtualization based (NFV-based) communication network utilizing at least one virtual service testing element, in accordance with one embodiment.

FIG. 1 illustrates a method 100 for testing at least a portion of a Network Function Virtualization based (NFV-based) communication network utilizing at least one virtual service testing element, in accordance with one embodiment.

As shown, at least one virtual service testing element is instantiated. See operation 102. The at least one virtual service testing element is operable for testing at least a portion of a NFV-based communication network including a plurality of virtual services.

The virtual service testing element may include any number of virtual services and/or virtual network functions (VNFs). Moreover, the virtual service testing element may be operable for testing the entire NFV-based communication network, a portion of the NFV-based communication network, one or more virtual services in the NFV-based communication network, and/or portions of one or more virtual services in the NFV-based communication network.

This may include, for example, testing of a single VNF instance (e.g. testing an addition, removal), testing changes made in networking configuration between successive VNFs, and testing changes made to VNF cluster configurations (i.e., high-availability clusters, load-balancing clusters, etc.).

Further, at least one time to implement the at least one virtual service testing element is identified such that the at least one virtual service testing element tests the at least a portion of the NFV-based communication network by: sending a known test case communication from the at least one virtual service testing element as an input to an ingress point of the at least a portion of the NFV-based communication network; receiving a result of the input as an output at an egress point of the at least a portion of the NFV-based communication network; and analyzing the result to determine whether at least a portion of the NFV-based communication network is performing as expected. See operation 104.

The ingress point refers to any point in the NFV-based network where the test input is initiated. The egress point refers to any point in the NFV-based network where the output is received or identified (e.g. identified to be examined as the output, etc.). In one embodiment, the ingress point and the egress point may be the same (e.g. during an end-to-end system test in a full round-trip configuration, etc.). In another embodiment, the ingress point and the egress point may be different (e.g. when testing a portion of the network, specific services, portions of services, etc.).

Accordingly, the virtual service testing element may be a single module and/or multiple modules (e.g. one module associated with an ingress point/input, and one module associated with an egress point/output, etc.). Thus, the virtual service testing element may represent a single element functionally placed such that an input is sent from a point where an output is also received, or multiple elements functionally placed such that an input is sent from a point different than from where the output is received.

Furthermore, because the testing element is a virtual service or VNF, the virtual service testing element may be moved/positioned dynamically as desired. For example, at least one first point in the NFV-based communication network may be identified to functionally locate the virtual service testing element, and the virtual service testing element may be functionally located at the first point of the NFV-based communication network. Subsequently, at least one second point in the NFV-based communication network may be identified to functionally locate the virtual service testing element, and thus the virtual service testing element may be functionally moved from the first point of the NFV-based communication network to the second point of the NFV-based communication network.

The positioning and/or the moving of the ingress and/or the egress point and/or the virtual service testing element may depend on any number of factors, such as a predefined test plan, the addition of functionality (e.g. the addition of services, etc.), the removal of functionality (e.g. the removal of services, etc.), the updating of virtual services, perceived issues, faults, and/or based on various other criteria. Still yet, in one embodiment, the testing element may be located outside of the NFV-based communication network. In this case the testing element may include a physical testing element.

Moreover, the time to implement the virtual service testing element may be determined utilizing various techniques. For example, identifying the time to implement the virtual service testing element may include utilizing a test plan to identify the time to implement the virtual service testing element. In this case, the test plan may be a predefined plan for testing the network, a portion of a network, and/or services. Thus, the virtual service testing element may be implemented at various times.

For example, a schedule for implementing the virtual service testing element may be generated. In this case, the schedule may identify the time to implement the virtual service testing element.

As another example, identifying the time to implement virtual service testing element may include receiving a command to implement the at least one virtual service testing element. For example, the virtual service testing element may be implemented on demand for testing various aspects of the network. Moreover, the command may be received from a variety of sources.

In addition, a manual command may be received to test a service element from an Orchestrator administrator, either from the Orchestrator administration UI or from an external administration system. As another example, the service/VNF may be tested as part of the service/VNF first instantiation procedure, just before real traffic is steered to that service/VNF.

For example, the command may be received from at least one virtual service. In this case, the command may be sent based on at least one event in the NFV-based communication network. For example, the event in the NFV-based communication network may include an event identified as a potential failure event. As an example, a virtual service may determine that an anomaly or issue has occurred in the network. In response to this, the virtual service may initiate a test on an affected portion of the network by implementing the virtual service testing element.

In either case, the virtual service testing element may test a portion of the NFV-based communication network, all services in the NFV-based communication network, and/or portions of virtual services.

The known test case may include any test case and/or scenario capable of testing a desired aspect of the network. In various embodiments, the test case may include simplified inputs or more detailed inputs. In either case, the known test case will include an input that will produce a known (or knowable) result when processed by desired elements to be tested. Thus, if the result does not match an expected result, it may be determined that there is an issue with the tested elements/services. In this case, the elements/services may be retested, or different elements/services may be tested as a type of drill down testing.

For example, if analyzing the result indicates that the tested portion of the NFV-based communication network is not performing as expected, another portion of the NFV-based communication network may be identified to test. As another example, if analyzing the result indicates that the tested portion of the NFV-based communication network is not performing as expected, one or more services associated with the NFV-based communication network in which to perform testing may be identified.

In addition, the source to the problem may be outside to the NFV-based communication network, so the orchestrator may also choose to send the indication about the test result (in case where it does not meet the expected result), to external system for further handling.

Thus, the method 100 may be utilized to test various aspects of existing operational NFV-based communication networks, and to perform drilldown testing on the network if issues are detected. Moreover, the virtual service testing element may be dynamically moved and instantiated throughout a network, as desired, with little or no impact on normal network operation.

Additionally, any VNF and/or virtual service in the network may be utilized to instantiate the virtual service testing element. Furthermore, any VNF and/or virtual service in the network may be utilized to determine where to instantiate the virtual service testing element. Still yet, in one embodiment, a dedicated module may be utilized to perform some or all of this functionality. In this case, the dedicated module may include any number of VNFs and/or virtual services. As described below, such module may generally be described as a testing module.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for testing at least a portion of a NFV-based communication network utilizing at least one virtual service testing element according to various embodiments may be further understood with reference to the following drawings and accompanying description.

Figure 2:
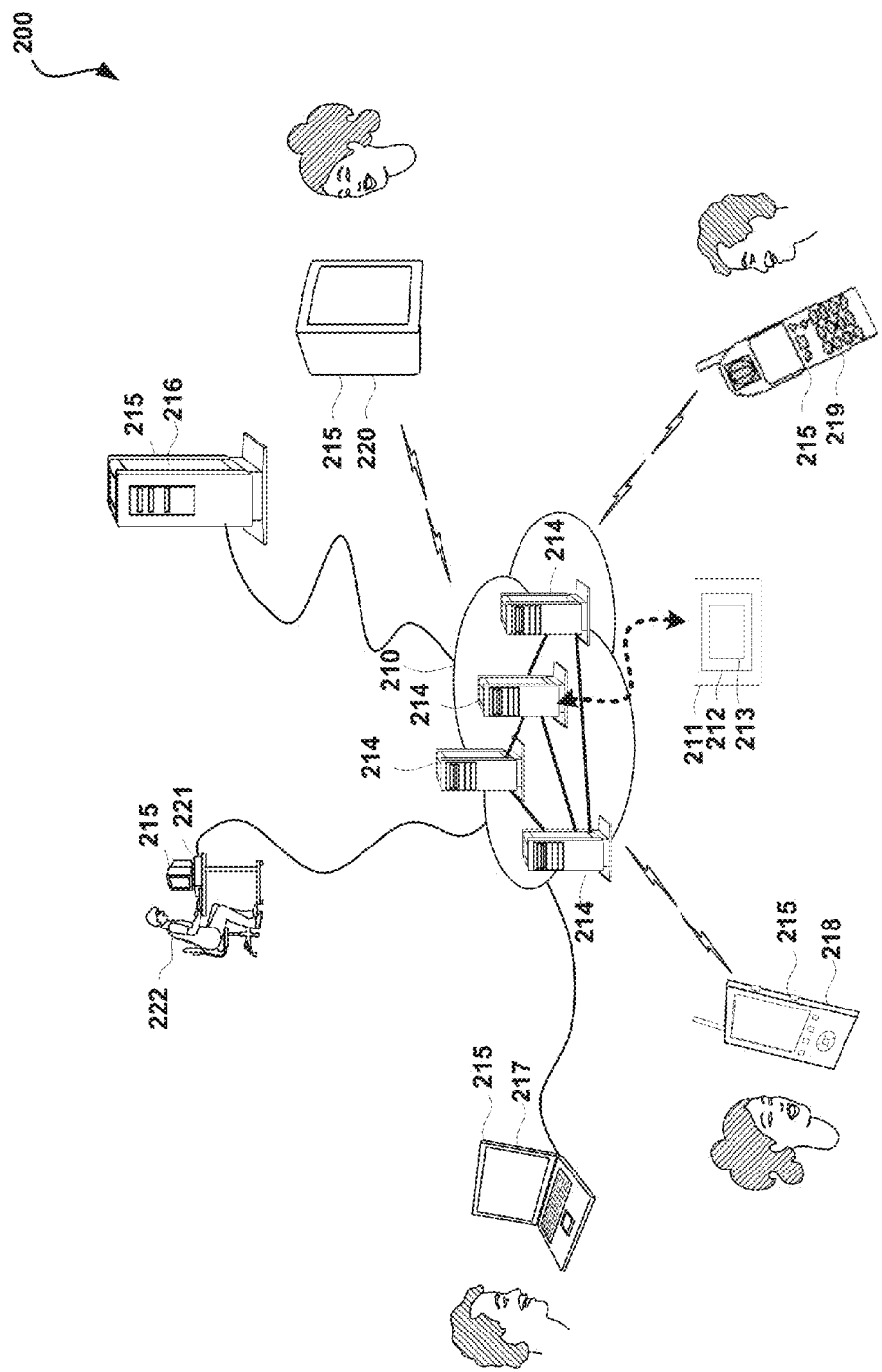
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a testing module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the testing module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The testing module 213 may be a part or a component of the NFV-O module 212. However, the testing module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the testing module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the testing module 213.

Figure 3:
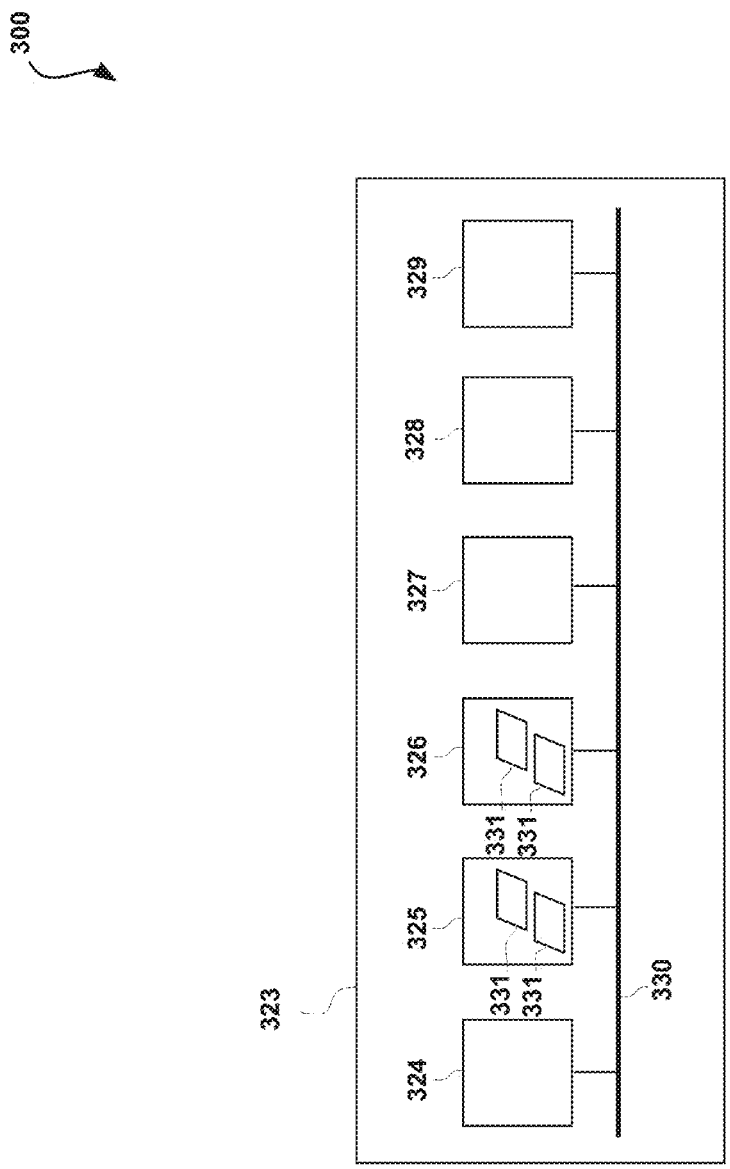
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the testing module 213 of FIG. 2.

Figure 4:
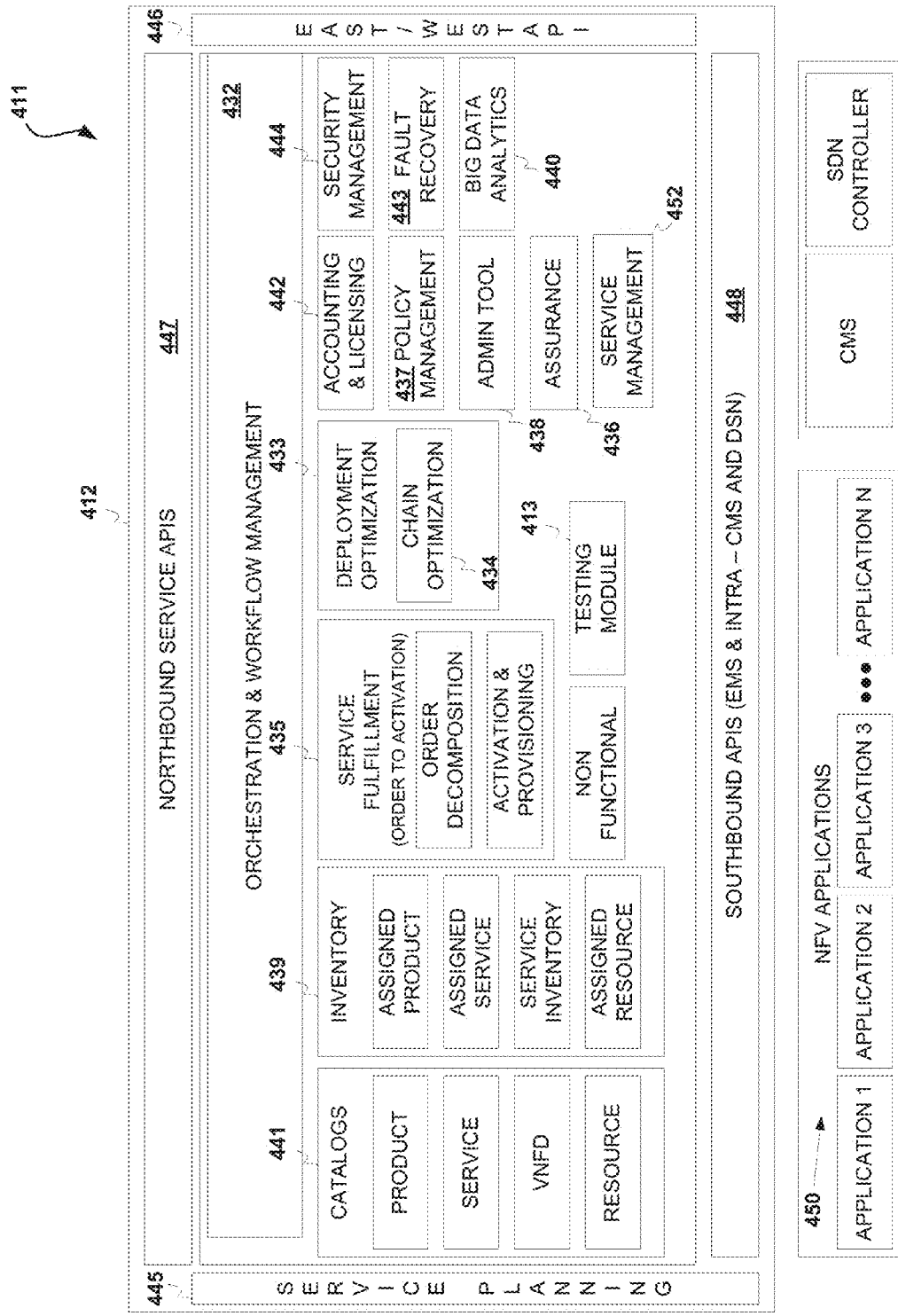
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a testing module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The testing module 413 may also be part of the NFV-O module 412. The testing module 413 is operable to test at least a portion of a NFV-based communication network by sending a known test case communication to an ingress point of the NFV-based communication network, receiving a result of the input as an output at an egress point, and analyzing the result to determine whether at least a portion of the NFV-based communication network is performing as expected. Moreover, the testing module 413 may be operable to implement any functionality described in the context of FIG. 1.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
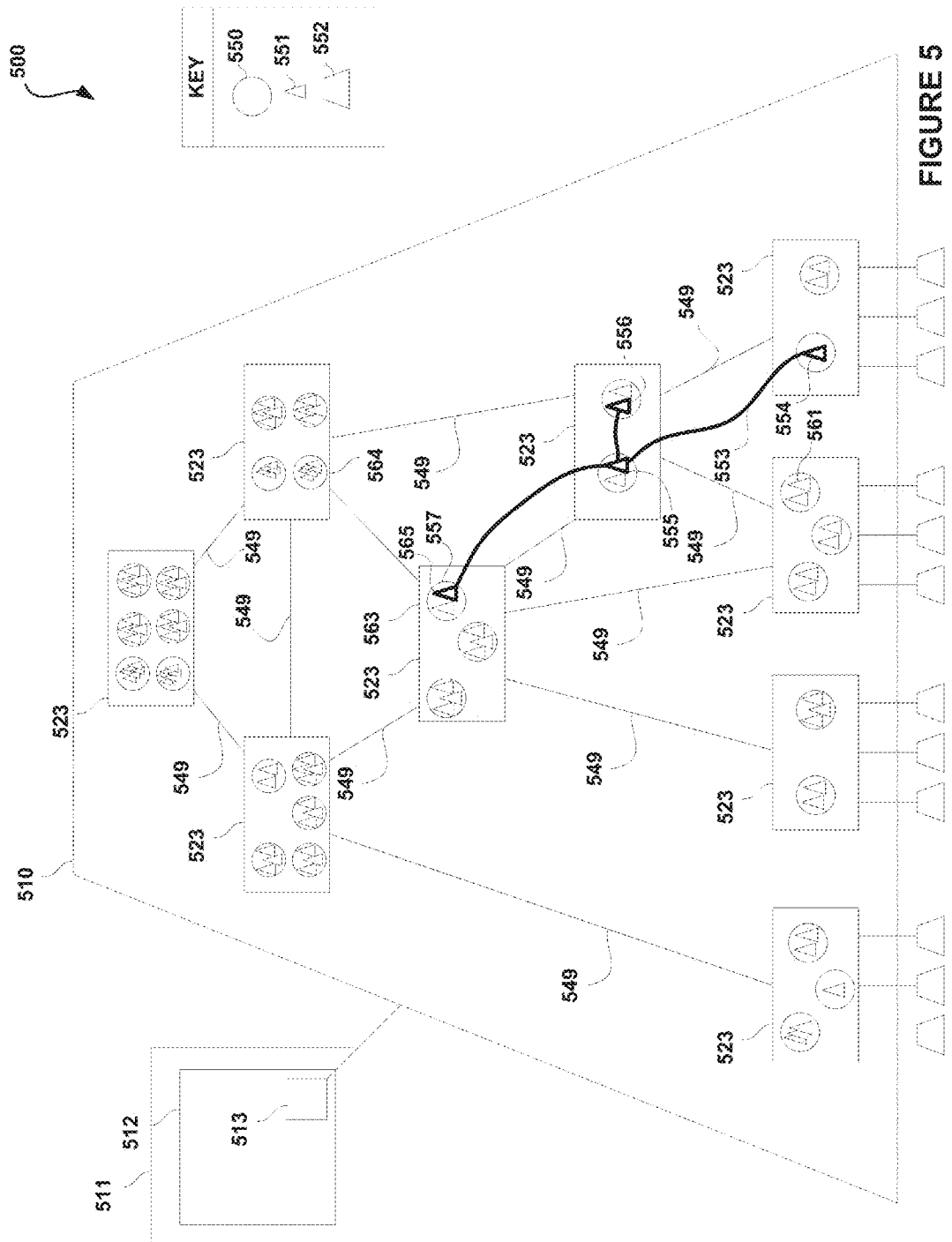
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a testing module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
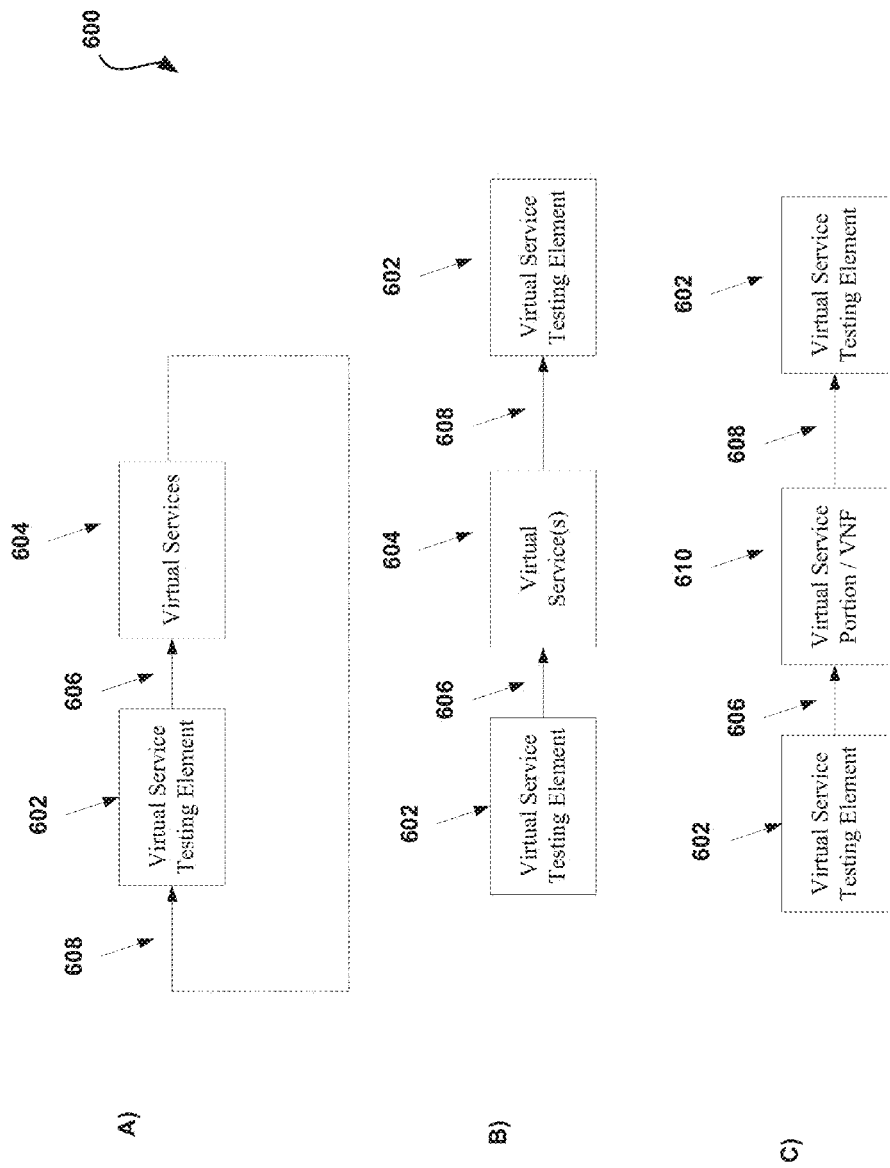
FIG. 6 illustrates simplified diagrams of implementing at least one virtual service testing element in a NFV-based communication network, in accordance with one embodiment.

FIG. 6 illustrates simplified diagrams 600 of implementing at least one virtual service testing element in a NFV-based communication network, in accordance with one embodiment. As an option, the diagrams 600 may be viewed in the context of the details of the previous Figures. Of course, however, the diagrams 600 may be viewed in the context of any desired environment. Further, the aforementioned definitions may equally apply to the description below.

As shown, a virtual service testing element 602 may be instantiated and/or implemented to test various aspects of a network/system. For example, as shown in example A, the virtual service testing element 602 may be implemented to test one or more virtual services 604, which may represent a portion of a network or all virtual services in a network/system.

In operation, a known test case communication may be sent from the virtual service testing element 602 as an input to an ingress point 606 of at least a portion of the NFV-based communication network. Further, a result of the input is received as an output at an egress point 608 of the portion of the NFV-based communication network. The result is analyzed to determine whether the portion of the NFV-based communication network is performing as expected.

As shown in example B, the virtual service testing element 602 may include more than one element that may be implemented to test one or more virtual services 604, which may represent a portion of a network or all virtual services in a network/system. In this case, the first virtual service testing element 602 may send the known test case communication as an input to the ingress point 606 and the result of the input may be received as an output at the egress point 608 by the second virtual service testing element 602, which may then be analyzed.

Still yet, as shown in example C, the virtual service testing element 602 may test a portion of a virtual service and/or specific VNFs. Of course, the examples shown in FIG. 6 are not limiting as many other test scenarios may be implemented.

Figure 7:
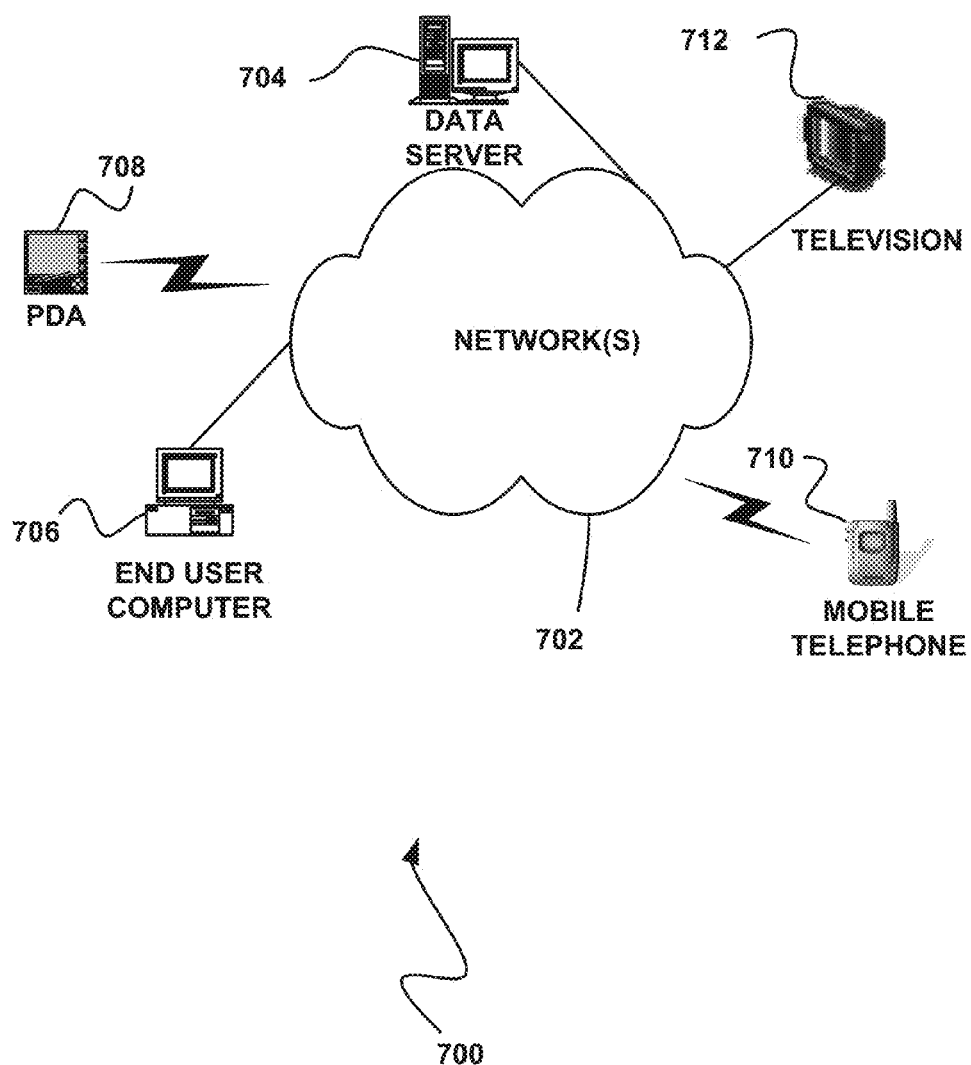
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
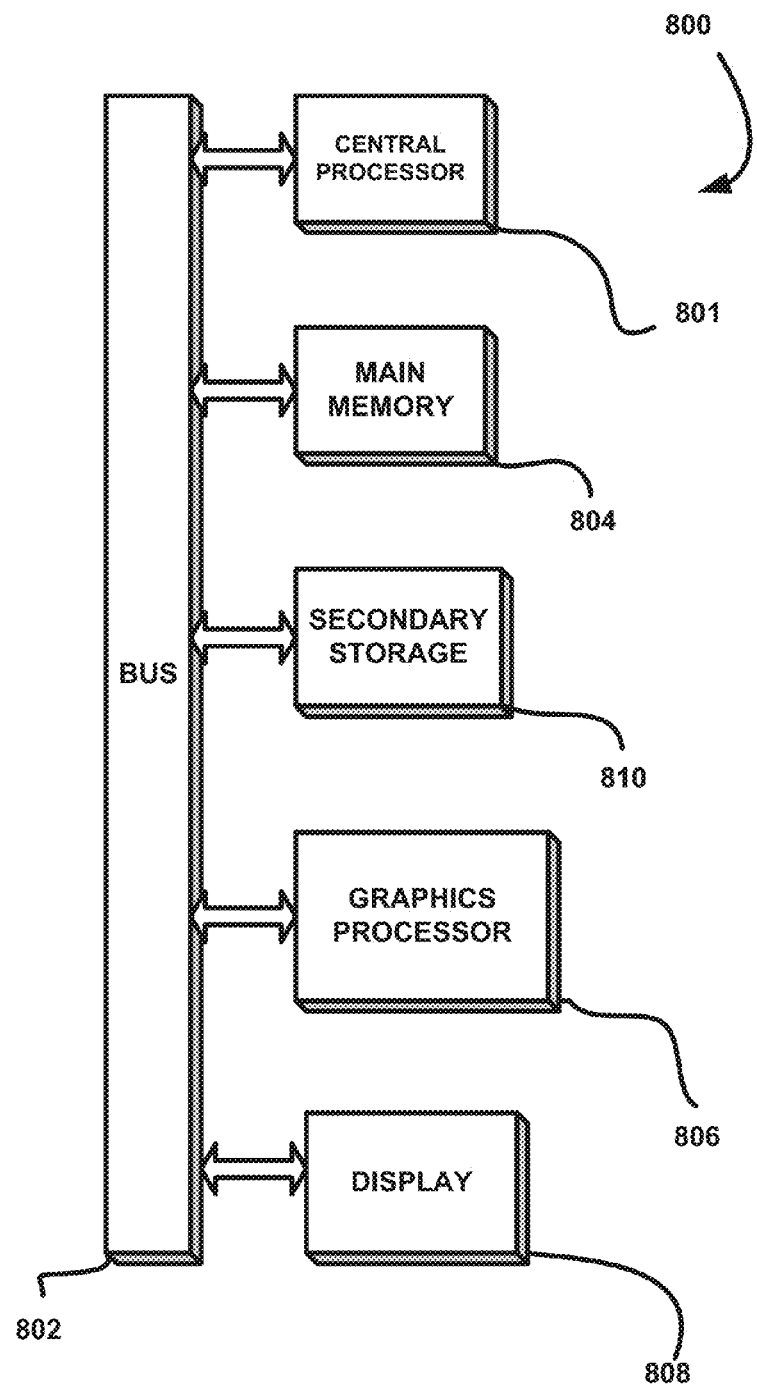
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
instantiating at least one virtual service testing element, the at least one virtual service testing element being at least one virtual service or at least one virtual network function (VNF), and the at least one virtual service testing element being operable for testing at least a portion of a Network Function Virtualization based (NFV-based) communication network including a plurality of virtual services; and
identifying at least one time to implement the at least one virtual service testing element;
at the identified time, implementing the at least one virtual service testing element to test the at least a portion of the NFV-based communication network by:
sending a known test case communication from the at least one virtual service testing element as an input to an ingress point of the at least a portion of the NFV-based communication network,
receiving a result of the input as an output at an egress point of the at least a portion of the NFV-based communication network, and
analyzing the result to determine whether at least a portion of the NFV-based communication network is performing as expected;
wherein the virtual service testing element being the at least one virtual service or the at least one virtual network function (VNF) enables the virtual service testing element to be dynamically moved across the NFV-based communication network, including:
identifying at least one first point in the NFV-based communication network to functionally locate the at least one virtual service testing element,
functionally locating the at least one virtual service testing element at the at least one first point of the NFV-based communication network,
identifying at least one second point in the NFV-based communication network to functionally locate the at least one virtual service testing element, and
functionally moving the at least one virtual service testing element from the at least one first point of the NFV-based communication network to the at least one second point of the NFV-based communication network.

2. The method of claim 1, wherein identifying the at least one time to implement the at least one virtual service testing element includes utilizing a test plan to identify the at least one time to implement the at least one virtual service testing element.

3. The method of claim 1, wherein identifying the at least one time to implement the at least one virtual service testing element includes receiving a command to implement the at least one virtual service testing element.

4. The method of claim 3, wherein the command is received from at least one virtual service.

5. The method of claim 3, wherein the command is sent based on at least one event in the NFV-based communication network.

6. The method of claim 5, wherein the at least one event in the NFV-based communication network includes an event identified as a potential failure event.

7. The method of claim 1, wherein the at least one virtual service testing element tests a portion of the NFV-based communication network.

8. The method of claim 1, wherein the at least one virtual service testing element tests all services in the NFV-based communication network.

9. The method of claim 1, wherein, if analyzing the result indicates that the at least a portion of the NFV-based communication network is not performing as expected, further comprising identifying another portion of the NFV-based communication network to test.

10. The method of claim 1, wherein, if analyzing the result indicates that the at least a portion of the NFV-based communication network is not performing as expected, further comprising identifying one or more services associated with the NFV-based communication network in which to perform testing.

11. The method of claim 1, further comprising generating a schedule for implementing the at least one virtual service testing element.

12. The method of claim 11, wherein the schedule identifies the at least one time to implement the at least one virtual service testing element.

13. The method of claim 1, further comprising instantiating the at least one virtual service testing element in an existing operational NFV-based communication network.

14. The method of claim 1, wherein the virtual service testing element is the at least one virtual service.

15. The method of claim 1, wherein the virtual service testing element is the at least one VNF.

16. A computer program product embodied on a non-transitory computer readable medium, comprising:
computer code for instantiating at least one virtual service testing element, the at least one virtual service testing element being at least one virtual service or at least one virtual network function (VNF), and the at least one virtual service testing element being operable for testing at least a portion of a Network Function Virtualization based (NFV-based) communication network including a plurality of virtual services; and
computer code for identifying at least one time to implement the at least one virtual service testing element;
computer code for implementing, at the identified time, the at least one virtual service testing element to test the at least a portion of the NFV-based communication network by:
sending a known test case communication from the at least one virtual service testing element as an input to an ingress point of the at least a portion of the NFV-based communication network,
receiving a result of the input as an output at an egress point of the at least a portion of the NFV-based communication network, and
analyzing the result to determine whether at least a portion of the NFV-based communication network is performing as expected;
wherein the virtual service testing element being the at least one virtual service or the at least one virtual network function (VNF) enables the virtual service testing element to be dynamically moved across the NFV-based communication network, including:
identifying at least one first point in the NFV-based communication network to functionally locate the at least one virtual service testing element,
functionally locating the at least one virtual service testing element at the at least one first point of the NFV-based communication network, identifying at least one second point in the NFV-based communication network to functionally locate the at least one virtual service testing element, and functionally moving the at least one virtual service testing element from the at least one first point of the NFV-based communication network to the at least one second point of the NFV-based communication network.

17. A system comprising:

a memory system; and one or more processing cores coupled to the memory system and that are each configured to:

instantiate at least one virtual service testing element, the at least one virtual service testing element being at least one virtual service or at least one virtual network function (VNF), and the at least one virtual service testing element being operable for testing at least a portion of a Network Function Virtualization based (NFV-based) communication network including a plurality of virtual services; and identify at least one time to implement the at least one virtual service testing element;

at the identified time, implement the at least one virtual service testing element to test the at least a portion of the NFV-based communication network by:

sending a known test case communication from the at least one virtual service testing element as an input to an ingress point of the at least a portion of the NFV-based communication network, receiving a result of the input as an output at an egress point of the at least a portion of the NFV-based communication network, and analyzing the result to determine whether at least a portion of the NFV-based communication network is performing as expected;

wherein the virtual service testing element being the at least one virtual service or the at least one virtual network function (VNF) enables the virtual service testing element to be dynamically moved across the NFV-based communication network, including:

identifying at least one first point in the NFV-based communication network to functionally locate the at least one virtual service testing element, functionally locating the at least one virtual service testing element at the at least one first point of the NFV-based communication network, identifying at least one second point in the NFV-based communication network to functionally locate the at least one virtual service testing element, and functionally moving the at least one virtual service testing element from the at least one first point of the NFV-based communication network to the at least one second point of the NFV-based communication network.

* * * * *